US012790043B2

(12) United States Patent
Chu et al.

(10) Patent No.: US 12,790,043 B2
(45) Date of Patent: Nov. 10, 2026

(54) MECHANISM FOR INDICATING THE OPENING OF A FLIGHT DEVICE GUIDANCE TUBE CAP

(71) Applicant: VIETTEL GROUP, Ha Noi City (VN)

(72) Inventors: Minh Thanh Chu, Ha Noi City (VN); Quang Duc Tran, Ha Noi City (VN); Quang Huy Ho, Ha Noi City (VN); Van Phuong Do, Ha Noi City (VN); Sy Hoang Ngo, Ha Noi City (VN)

(73) Assignee: VIETTEL GROUP, Ha Noi City (VN)

( * ) Notice: Subject to any disclaimer, the term of this patent is extended or adjusted under 35 U.S.C. 154(b) by 2 days.

(21) Appl. No.: 18/952,923

(22) Filed: Nov. 19, 2024

(65) Prior Publication Data

US 2025/0282489 A1 Sep. 11, 2025

(30) Foreign Application Priority Data

Mar. 8, 2024 (VN) .............................. 1-2024-01742

(51) Int. Cl.
*B64U 70/50* (2023.01)
*B64U 80/70* (2023.01)

(52) U.S. Cl.
CPC .............. *B64U 70/50* (2023.01); *B64U 80/70* (2023.01)

(58) Field of Classification Search
CPC .......... B64U 70/50; B64U 80/70; H01H 3/16; G01D 5/244
See application file for complete search history.

(56) References Cited

U.S. PATENT DOCUMENTS 4,040,334 A * 8/1977 Smethers, Jr. ............ F41F 3/06 89/1.804
2022/0401954 A1* 12/2022 Angeles ............ B01L 3/502715
2025/0282489 A1* 9/2025 Chu ....................... B64U 70/50

* cited by examiner

*Primary Examiner* — Hoi C Lau
(74) *Attorney, Agent, or Firm* — patenttm.us

(57) ABSTRACT

A mechanism for indicating the opening of a flight device guidance tube cap, comprising: a signal switch (20) connected to the flight device control system, and a switch activator (30) with a release pin (36) that is automatically withdrawn immediately after the guidance tube cap opens to a predetermined angle. This withdrawal activates the push pin (35), which presses the button (20*a*) of the signal switch (20), thereby activating the switch.

11 Claims, 9 Drawing Sheets

A

MECHANISM FOR INDICATING THE OPENING OF A FLIGHT DEVICE GUIDANCE TUBE CAP

FIELD OF THE INVENTION

The invention relates to the field of aviation. Specifically, it refers to a mechanism for automatically indicating to the flight device control system when the cap of the guidance tube has been fully opened.

BACKGROUND OF THE INVENTION

Typically, some known flight device deployment systems include guidance tubes and control systems. The guidance tube is often a hollow cylindrical structure, with an output end covered by a cap to isolate the interior of the tube from the external environment. This helps preserve the flight device during storage or transport. Before the flight device is deployed, the cap must be opened at a predetermined angle (usually greater than 90 degrees) to prevent interference with the flight path. Immediately after, the flight device is activated to ensure timely deployment.

In general, flight devices with actively opened caps are often activated after a set amount of time, corresponding to the time required for the cap to fully open. However, this presents a drawback: the flight device may activate while the cap has not yet reached the required angle, or the cap may fail to open fully due to mechanical issues.

Thus, there is a need for a mechanism that reports the status of the cap opening, ensuring that the control system is aware of whether the cap is fully open or closed, and preventing premature activation of the flight device.

SUMMARY OF THE INVENTION

The invention provides a mechanism that automatically indicates to the flight device control system when the guidance tube cap is opened to the predetermined angle. Another objective is to provide a mechanism that automatically triggers a signal switch, using the force exerted by the opening cap to release a trigger pin. Furthermore, the invention proposes a mechanism with a stopper to prevent the trigger pin from loosening or being removed while the cap is in the closed position, ensuring safety during storage or transport of the guidance tube along with the flight device inside it. To achieve these objectives, the mechanism comprises:

- A first mounting base (10) fixed inside the guidance tube (100).
- A signal switch (20) and an activator (30) for the switch are mounted on the first base (10).
- The signal switch (20) is connected to the flight device control system and indicates the open/closed status of the cap.
- The activator (30) consists of a cylindrical housing (31) with a hollow section (32) containing a hole (32*a*).
- A push pin (35) and spring (34) that exert pressure on the pin, mounted in the hollow section (32), so that when the spring is compressed, it pushes the pin outwards to engage with the signal switch (20).
- The housing (31) has two aligned pin holes (311, 312) on its sides, through which a trigger pin (36) passes to hold the push pin (35) in place while the cap is closed.
- The trigger pin (36) is connected to a linkage mechanism (37), which in turn is attached to a second mounting base (39) fixed to the cap (200).
- When the cap (200) opens, the second base (39) moves, pulling the linkage mechanism (37), which withdraws the trigger pin (36) from the aligned holes (311, 312), allowing the spring (34) to push the pin (35) and activate the signal switch (20).

In one embodiment, the linkage assembly (37) is constructed from multiple individual linkages in the form of bars, connected sequentially by pivot joints, where the first and last linkages are attached to the second mounting base (39) and the release pin (36), respectively, by pivot joints.

Preferably, the linkage assembly (37) consists of two individual linkages in the form of bars, with the first linkage (371) being curved, and the second linkage (372) being straight.

In another embodiment, the push pin (35) is structured with a pin head (352) having a diameter larger than the hollow cylindrical section (32), a pin body (353) with a diameter smaller than the hollow section (32), and a pin tail (354) with a diameter smaller than the spring (34), formed by extending the pin body (353) to fit inside the spring (34).

In another embodiment, the hollow cylindrical section (32) includes a cylindrical hole (32*b*) positioned opposite and concentric with the through-hole (32*a*), where the cylindrical hole (32*b*) is fitted with an adjustment component (341) via a mounting component (342), allowing for adjustment of the spring (34) tension.

Preferably, the adjustment component (341) is a round cylindrical shape with an outer threaded end and a hex-shaped end, while the mounting component (342) includes a flange mount (342*a*) connected to the device housing (31) with bolts, and a mounting ring (342*b*) with an internal thread that connects to the external thread of the adjustment component (341).

Preferably, the adjustment component (341) has a through-hole (341*a*) along its axis, and the pin tail (354) of the push pin (35) extends through this hole.

Even more preferably, the end of the pin tail (354) is threaded to fit a nut (357), and the end of the pin tail (354) is also shaped with a hexagonal hole (356) along its axis, allowing the user to easily rotate the nut (357) while holding the hexagonal hole (356) with a tool, such as a wrench or hex key, to tighten and pull the push pin (35) backward during the installation of the release pin (36). Afterward, the nut (357) can be removed from the pin tail (354).

In another embodiment, the second mounting base (39) also includes a stopper (38) to press against the release pin (36) when the guidance tube cap (200) is in the closed position, preventing the release pin (36) from loosening during transportation.

In yet another embodiment, the device housing (31) has a limiting groove (315) positioned on its upper side, extending into the hollow cylindrical section (32), to receive a limiting pin (355) attached to the push pin (35), thereby limiting the movement range of the push pin (35).

Preferably, the limiting pin (355) is attached to the push pin (35) via a threaded connection.

DETAILED DESCRIPTION

Figure 1:
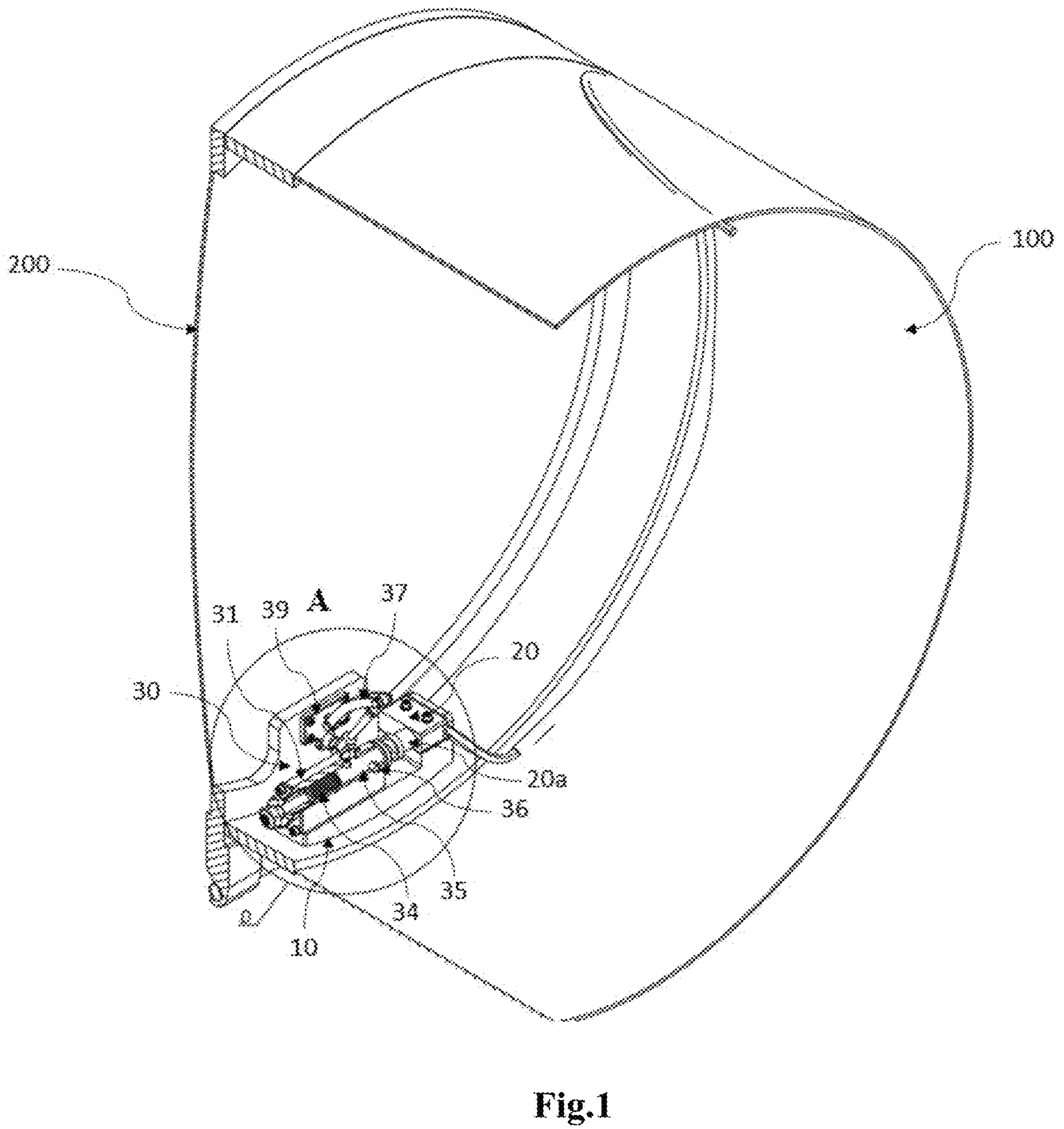
FIG. 1 is a partial perspective cross-sectional view illustrating the mechanism for indicating the opening of the flight device guidance tube cap according to the invention, with the cap in the closed position.

The invention will now be described in detail according to preferred embodiments with reference to the accompanying drawings.

As shown in FIGS. 1 through 9, the mechanism for indicating the opening of the flight device guidance tube cap, according to one embodiment of the invention, is constructed with a first mounting base (10) fixed to the inner wall of the guidance tube (100) near the open end. A signal switch (20) is connected to the flight device control system to transmit the open/closed status of the guidance tube cap. The signal switch (20) and the switch activator (30) are arranged sequentially on the first mounting base (10), where the switch activator (30) is structured to activate the signal switch (20) as soon as the guidance tube cap (200) opens to a predetermined angle (usually greater than 90 degrees), thereby notifying the control system that the cap (200) has opened, allowing the system to activate the flight device inside the guidance tube (100).

In general, the signal switch (20) used in the embodiments of the invention is designed to connect to the flight device control system via wiring. The switch has one or more buttons that, when pressed, close the circuit and send a signal to the flight device control system indicating that the guidance tube cap has been opened. The signal switch (20) can be securely attached to the first mounting base (10) in various ways, such as by screws, bolts, welding, etc. In the preferred embodiment shown in FIGS. 1 to 9, the signal switch (20) is fixed to one end of the first mounting base (10) using bolts, with the switch buttons (20*a*) facing the opposite end of the first mounting base (10). The switch activator (30) is mounted on the remaining part of the first mounting base (10) so that its push pin (35) can press the buttons (20*a*) of the signal switch (20) to activate the switch.

Figure 5:
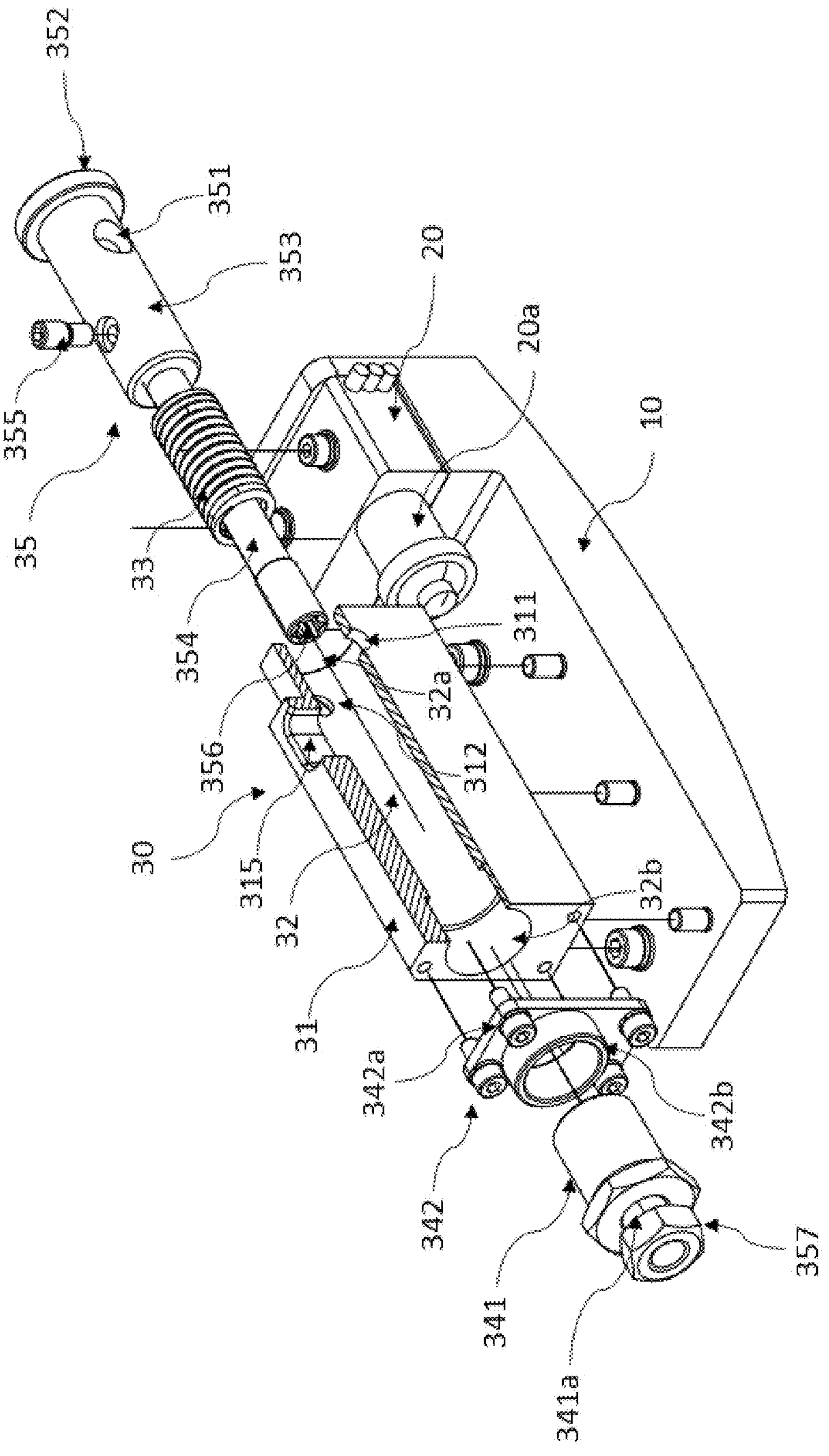
FIG. 5 is a perspective view detailing the assembly of the switch activator.

As shown in FIG. 5 and the drawings in FIG. 2, FIG. 4, FIG. 7, and FIG. 9, the switch activator (30) is structured to include the device housing (31), the spring (34), the push pin (35), the release pin (36), the linkage assembly (37), and the second mounting base (39).

The device housing (31) has a box-shaped structure that is fixed to the first mounting base (10) using bolts. The housing (31) contains a hollow cylindrical section (32) with a first opening located opposite the buttons (20*a*) of the signal switch (20).

The push pin (35) is cylindrical in shape and is installed along with the spring (34) inside the hollow cylindrical section (32) of the device housing (31). The head of the push pin (35) always remains outside the first opening (32*a*) and applies a predetermined force on the button (20*a*) of the signal switch (20). With this configuration, when the push pin (35) is pressed into the first opening (32*a*), the spring (34) compresses and stores energy. The spring (34) then tends to push the push pin (35) back out of the first opening (32*a*) to press the button (20*a*).

The push pin (35) is kept in the ready position to activate the button (20*a*) by the release pin (36). In this configuration, the device housing (31) has a pair of aligned pin holes (311, 312) on both sides, extending into the hollow cylindrical section (32), and the push pin (35) has a locking hole (351) aligned with the pair of pin holes (311, 312). When the push pin (35) is pressed into the hollow cylindrical section (32) through the first opening (32*a*), the locking hole (351) on the push pin (35) aligns with the pin holes (311, 312) on the device housing (31), allowing the release pin (36) to be inserted. When the release pin (36) is inserted, it holds the spring (34) in a compressed state and keeps the push pin (35) in the ready position. With this configuration, when the release pin (36) is withdrawn, the spring (34) is released from its compressed state, pushing the push pin (35) outwards to press the button (20*a*) of the signal switch (20), activating the switch.

To withdraw the release pin (36), the cap opening indicator mechanism uses the linkage assembly (37), with one end of the linkage connected to the release pin (36) and the other end connected to the second mounting base (39), which is fixed to the guidance tube cap (200). Thus, when the guidance tube cap (200) opens to a predetermined angle, the second mounting base (39) moves, pulling the linkage assembly (37), which withdraws the release pin (36) from the aligned pin holes (311, 312) and the locking hole (351), allowing the push pin (35) to be released and activating the signal switch (20).

Since the guidance tube cap (200) opens along a curved trajectory, the release pin (36) is not withdrawn along a straight path. Therefore, to prevent the release pin (36) from jamming, the ends of the aligned pin holes (311, 312) and the locking hole (351) are rounded or beveled.

It is essential that the release pin (36) is withdrawn smoothly and quickly when the guidance tube cap (200) is opened. Therefore, in one embodiment, the linkage assembly (37) consists of multiple individual linkages in the form of bars connected sequentially by pivot joints. The first and last linkages are attached to the second mounting base (39) and the release pin (36) via respective pivot joints. Additionally, to optimize the space occupied by the linkage assembly, avoid twisting of the linkage, and make it easier to control the assembly's state within the guidance tube (100), it is preferable, as shown in FIG. 1 to FIG. 4, for the linkage assembly (37) to consist of two individual linkages: the first linkage (371) and the second linkage (372), connected to each other and to the second mounting base (39) and release pin (36) by corresponding pivot joints. Furthermore, as the guidance tube cap moves along a circular path when opened, it is preferable that the first linkage (371) be curved, while the second linkage (372) is straight.

It is evident that, with this structure, during storage or transport, particularly when subjected to vibrations or shocks, the release pin (36) could loosen or be pulled out of the aforementioned pin holes. If this happens, the signal switch (20) could be activated even though the guidance tube cap (200) remains in the closed position. Therefore, in the preferred embodiment shown in FIG. 1 to FIG. 4, the second mounting base (39) is equipped with a stopper (38) that presses against the release pin (36) when the guidance tube cap (200) is closed, preventing the release pin (36) from loosening during transport.

Figure 2:
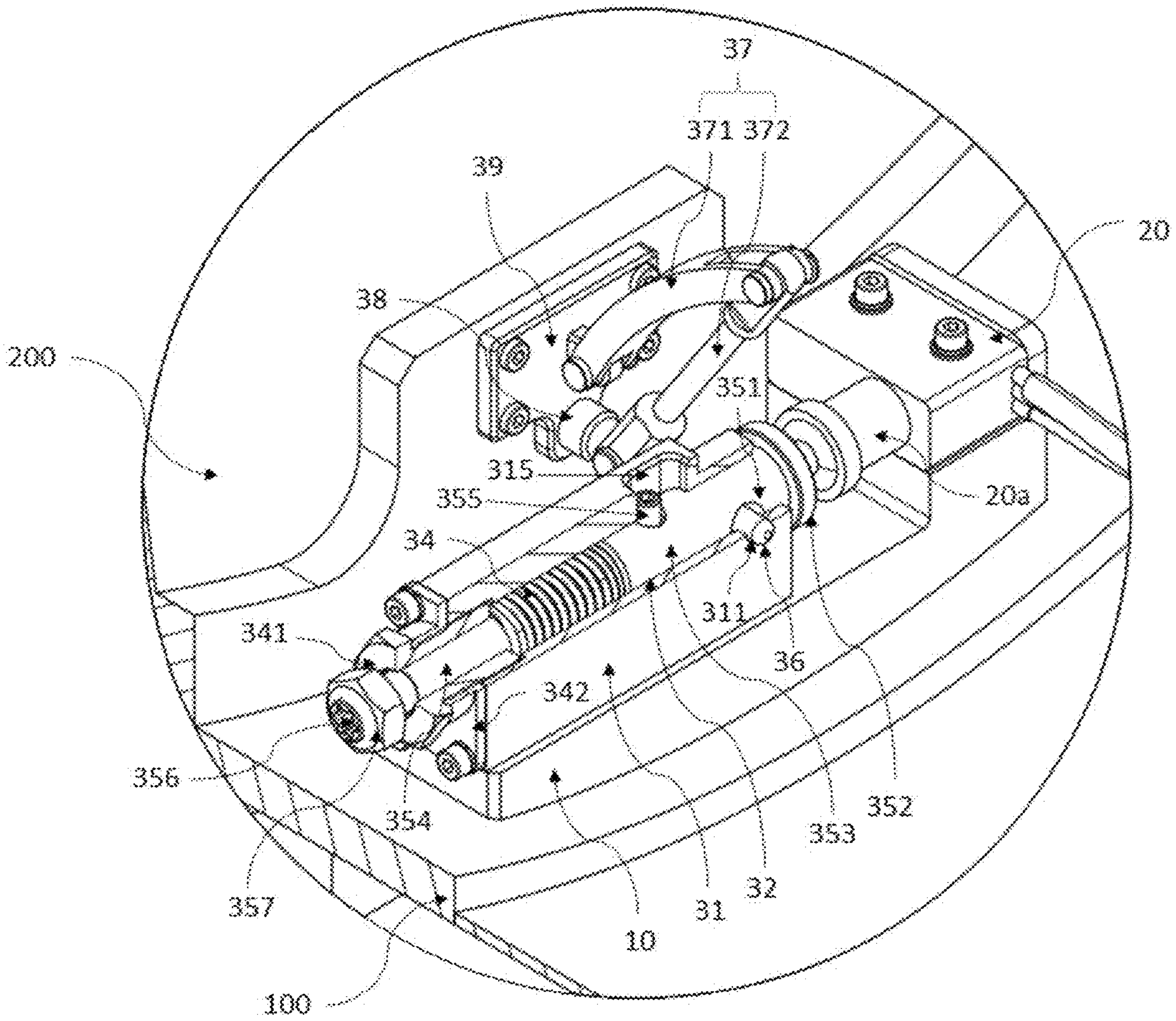
FIG. 2 is an enlarged view of section A in FIG. 1.
Figure 3:
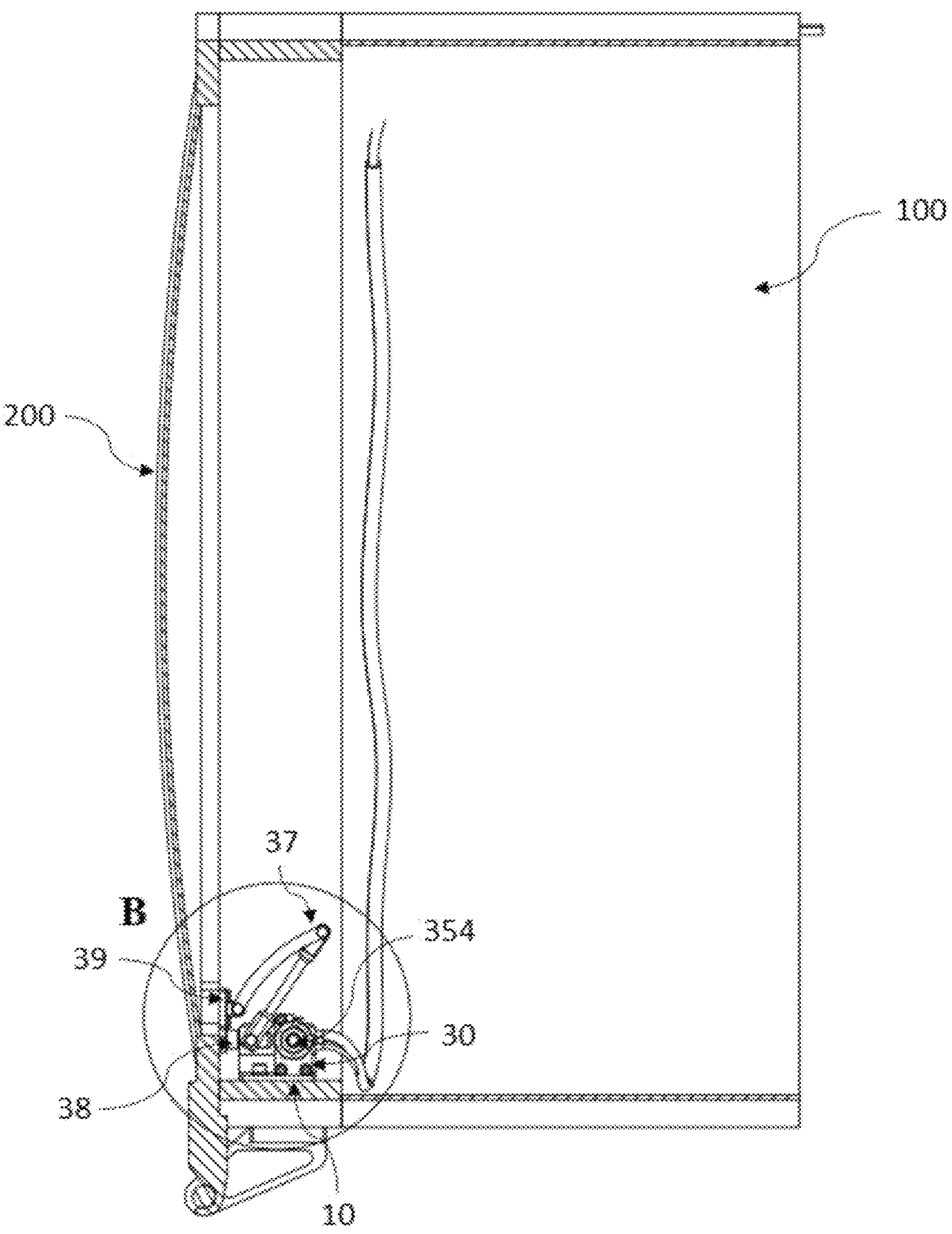
FIG. 3 is a side view of the mechanism shown in FIG. 1.
Figure 4:
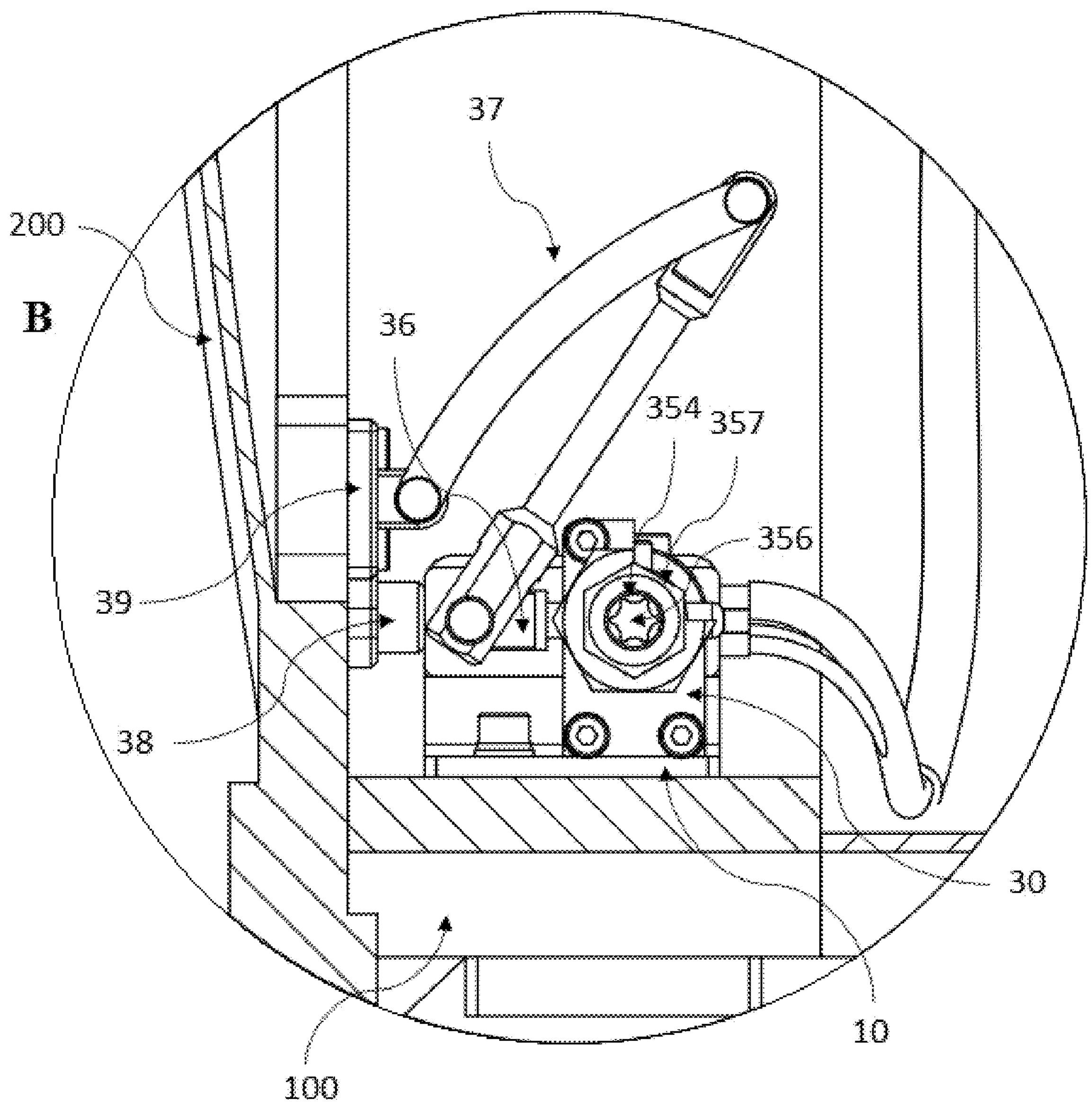
FIG. 4 is an enlarged view of section B in FIG. 3.

As shown in FIG. 1, FIG. 2, and FIG. 5, the push pin (35) of the switch activator (30), in one embodiment, is constructed in three parts: the pin head (352), which has a larger diameter than the hollow cylindrical section (32); the pin body (353), which has a smaller diameter than the hollow section (32); and the pin tail (354), which has a smaller diameter than the spring (34) and is formed by extending the pin body (353) to fit inside the spring (34). In this configuration, the spring (34) is guided simultaneously by the hollow cylindrical section (32) and the pin tail (354) of the push pin (35), with the inner end of the spring (34) resting on the bottom of the hollow cylindrical section (32) and the outer end resting on the transition between the pin body (353) and the pin tail (354).

With the pin head (352) having a larger diameter than the hollow cylindrical section (32), the user can easily press the push pin (35) when inserting the release pin (36). Additionally, the size of the pin head (352) allows it to simultaneously activate multiple buttons of the signal switch (20). The pin head (352) of the push pin (35) can be shaped in various forms, including square, rectangular, elliptical, or circular.

As shown in FIG. 1 and FIG. 5, the hollow cylindrical section (32) of the device housing (31) is also structured with a cylindrical hole (**32*b*) opposite and concentric with the through-hole (32*a*). The cylindrical hole (32*b*) is fitted with an adjustment component (341) via a mounting component (342) to support and adjust the tension of the spring (34). The adjustment component (341) is a cylindrical shape with an outer threaded end and a hexagonal end, while the mounting component (342) includes a flange (342*a*) attached to the device housing (31) at the cylindrical hole (32*b*) of the hollow cylindrical section (32) with bolts, and a mounting ring (342*b*) with internal threads that connect to the external threads of the adjustment component (341). To adjust the tension of the spring (34), the user only needs to use a tool such as a wrench to turn the hexagonal end of the adjustment component (341), thereby increasing or decreasing the tension of the spring (34**).

Preferably, the adjustment component (341) is structured with a through-hole (**341*a*) along its axis to accommodate the pin tail (354) of the push pin (35), which extends through this hole. The pin tail (354) is threaded to allow a nut (357) to be installed, and the end of the pin tail (354) has a hexagonal hole (356) along its axis. With this structure, the user can easily rotate the nut (357) while holding the hexagonal hole (356) with a tool, such as a wrench or hex key, to tighten and pull the push pin (35) backward during the installation of the release pin (36). It is evident that pulling the push pin (35) backward to install the release pin (36) is easier than pressing the pin forward, which is hindered by the signal switch (20**).

For example, if the spring (34) used has a high stiffness (to ensure the ability to activate the push pin), pressing the push pin from the front or pulling it by hand from the rear to install the release pin (36) is quite difficult or ineffective. In this case, to pull the push pin (35) backward, the user can easily do so by tightening the nut (357) with a tool such as a wrench. In this approach, as the nut (357) is tightened, the push pin (35) tends to rotate in the direction of the wrench. To prevent this, the tail of the pin (354) is designed with a manipulation hole (356) along its axis. During the process of tightening the nut (357), the push pin (35) is held in place using a tool (such as a hex key) inserted into the manipulation hole (356). After installing the release pin (36), the nut (357) is removed to avoid loosening, which could cause the nut to fall off during transportation.

Additionally, to prevent excessive force from being applied by the push pin (35) on the button (**20*a*) of the signal switch (20) and to control the push pin's range of motion, in the preferred embodiment as shown in FIGS. 1 through 9, the push pin (35) is also equipped with a limit pin (355) attached to the body of the pin (352). The device housing (31) also has a limit groove (315) located on its top side, extending into the hollow cylindrical section (32) to accommodate the limit pin (355) of the push pin (35). This configuration allows the push pin (35) to move only within the range defined by the length of the limit groove (315). The length of the limit groove (315) is selected to match the spring force of the spring (34), ensuring that the push pin (35) presses the button (20*a*) of the signal switch (20) with a predetermined force and distance. Preferably, the limit pin (355) is attached to the push pin (35) via a removable threaded connection on the pin body (352), making it easier to install the push pin (35) into the device housing (31**).

Next, the operating principle of the flight device guidance tube cap opening indicator mechanism according to the invention will be described.

FIGS. 1, 2, and 6 through 9 illustrate the specific operating principle of the cap opening indicator mechanism, from when the guidance tube cap is fully closed to when it is fully open. First, as shown in FIG. 1, when the guidance tube cap (200) is fully closed on the flight device guidance tube (100), the release pin (36) is inserted into the aligned pin holes (311, 312) of the device housing (31) and the locking hole (351) of the push pin (35). At this time, the push pin (35) is held in the ready-to-activate position by the release pin (36), thanks to the reactive force of the spring (34) in its compressed state. In this state, the linkage assembly (37), consisting of the first linkage (371) and the second linkage (372), is folded together, and the tail of the release pin (36), which is connected to the second linkage (372), is pressed against the stopper (38) attached to the second mounting base (39) to secure the release pin (36) in place, preventing it from loosening or being pulled out.

Figure 6:
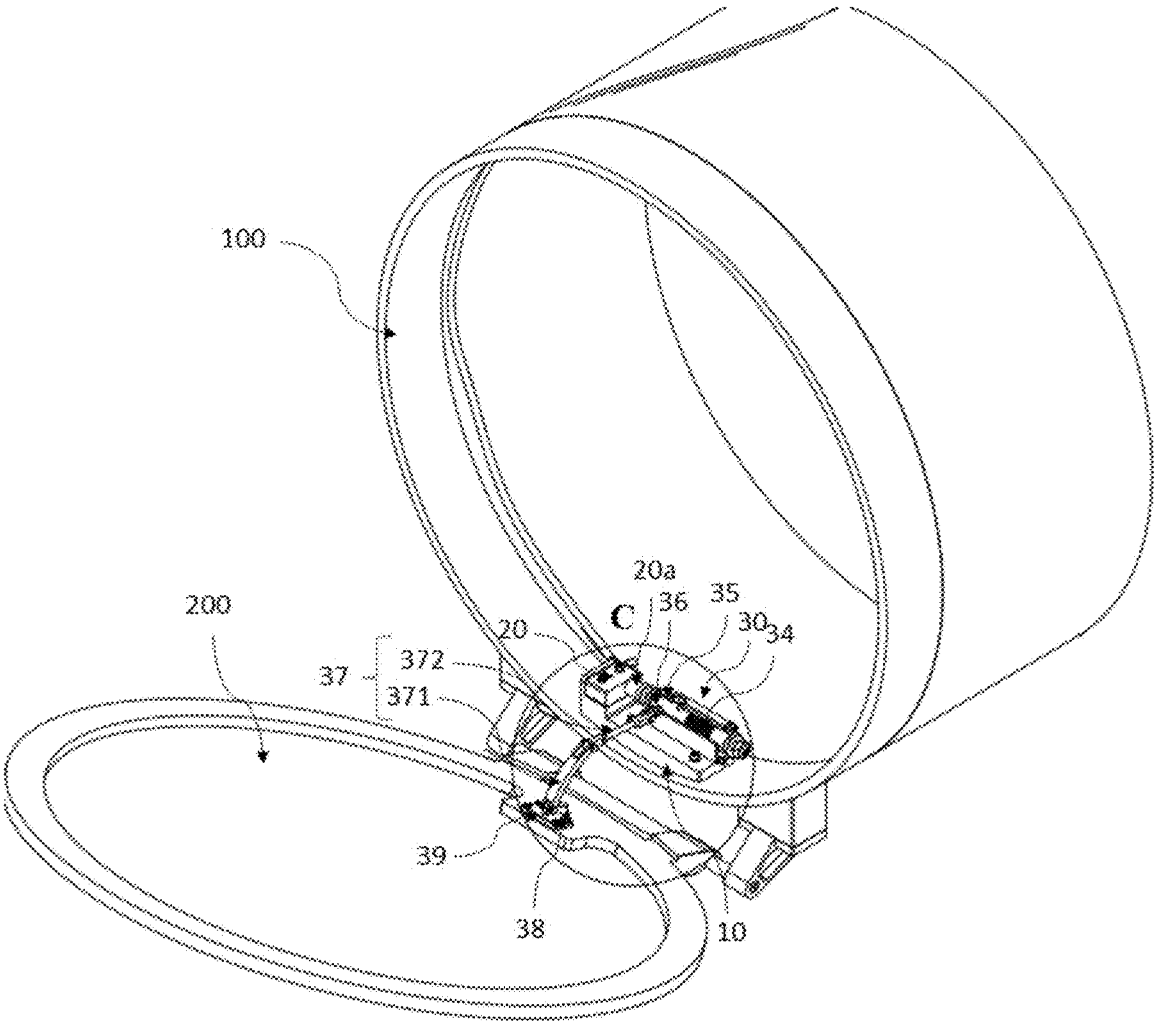
FIG. 6 is a perspective view showing the trigger mechanism of the cap opening indicator being partially withdrawn as the guidance tube cap begins to open.
Figure 7:
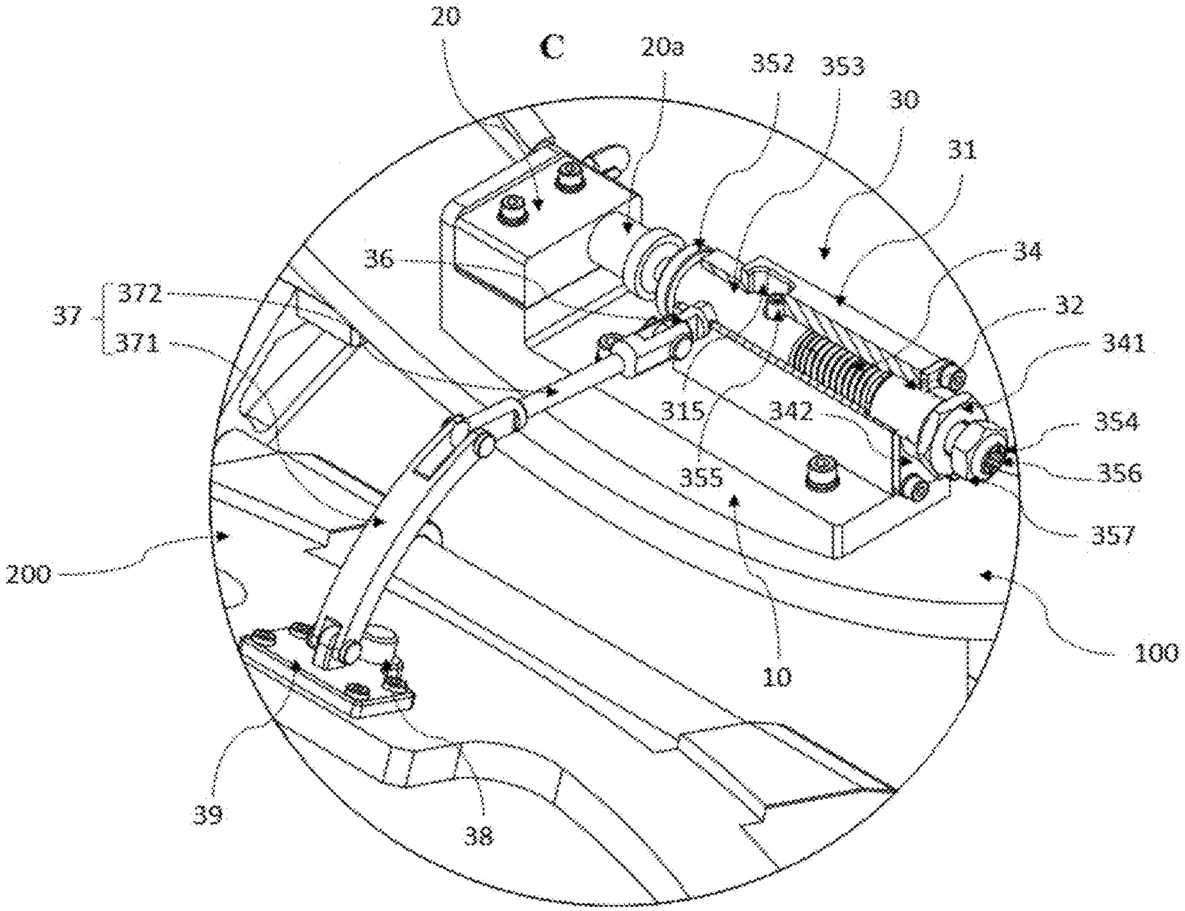
FIG. 7 is an enlarged view of section C in FIG. 6.
Figure 8:
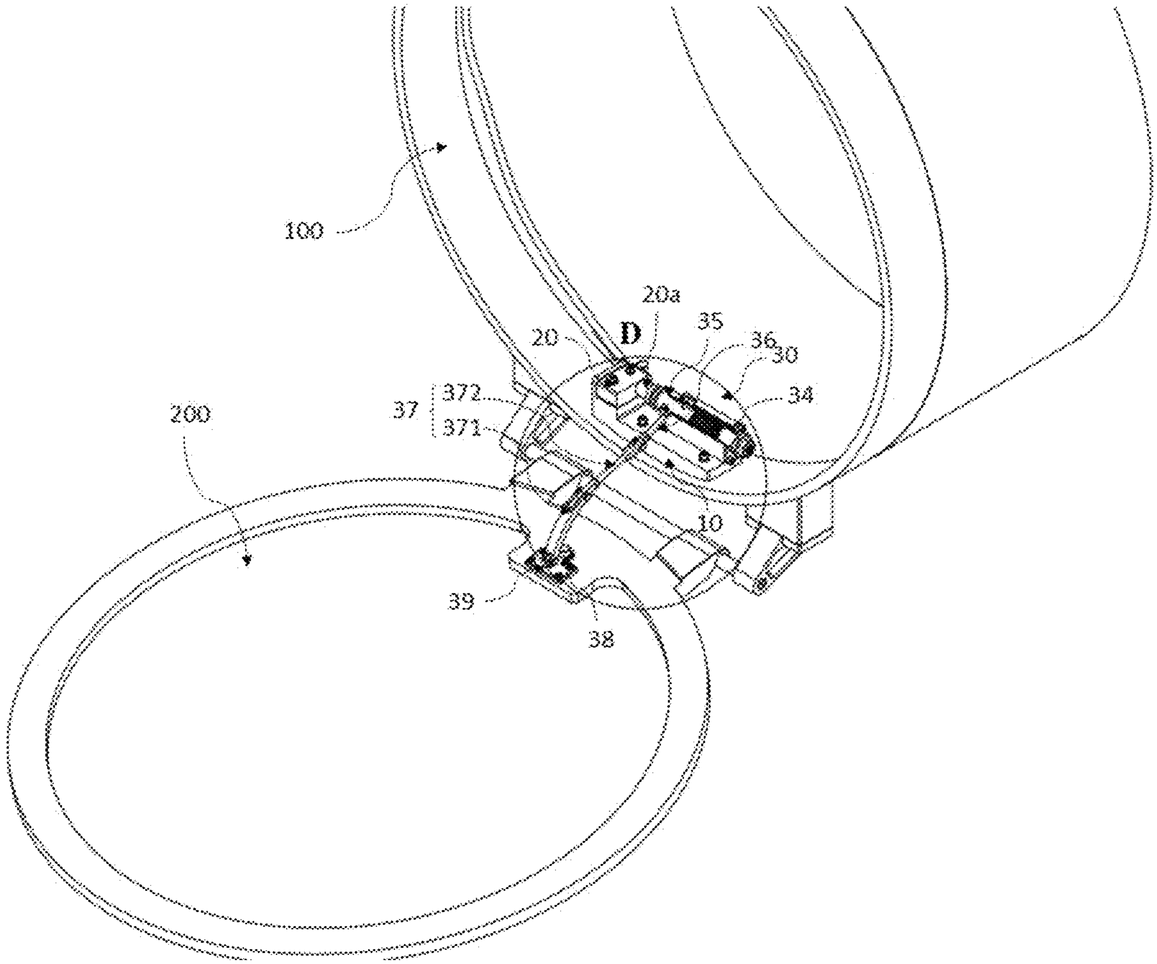
FIG. 8 is a perspective view showing the trigger mechanism of the cap opening indicator fully withdrawn to activate the signal switch when the guidance tube cap opens to the predetermined angle.
Figure 9:
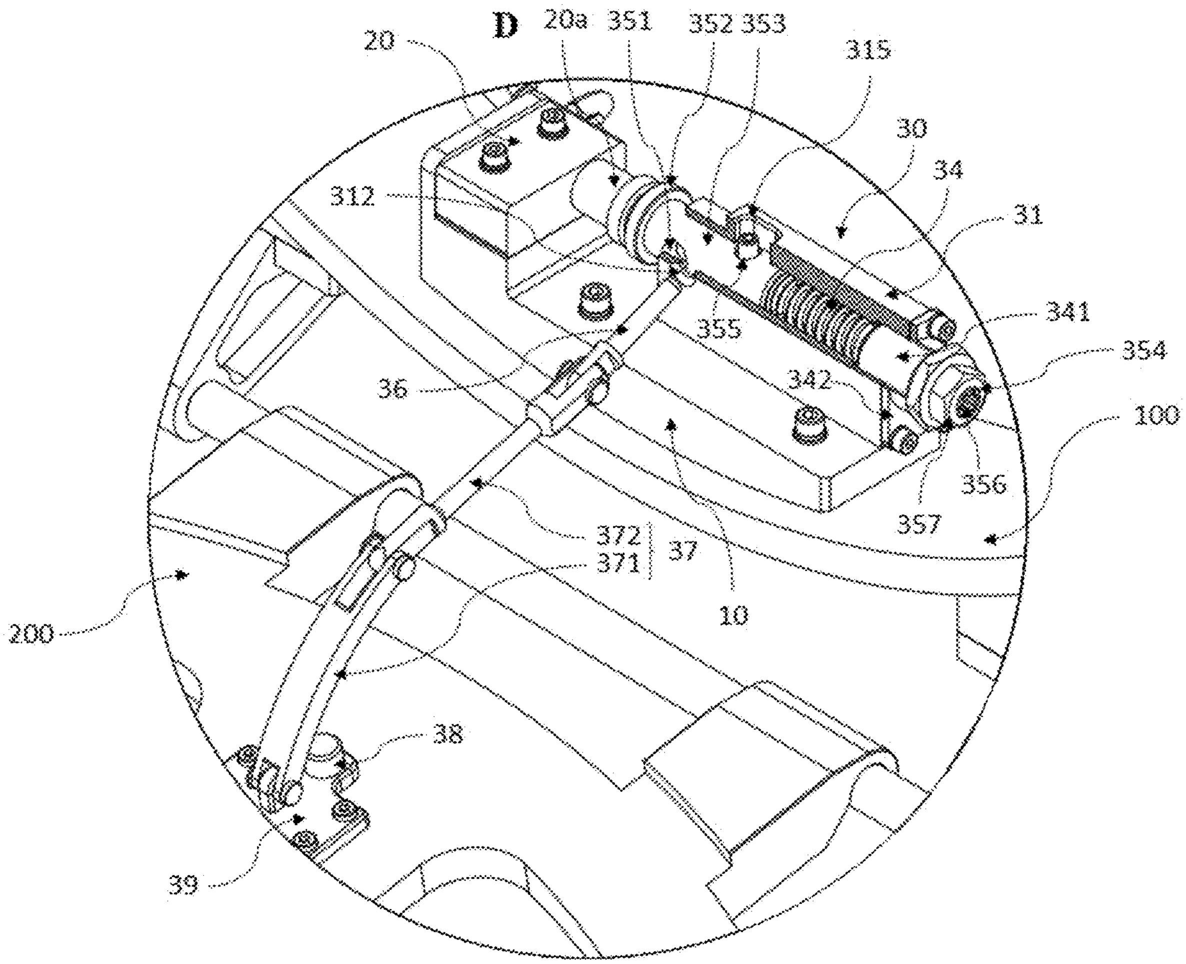
FIG. 9 is an enlarged view of section D in FIG. 8.

Next, when the guidance tube cap (200) is activated to open from the guidance tube (100), as shown in FIGS. 6 to 9, in order to deploy the flight device, the second mounting base (39), which is fixed to the guidance tube cap (200), moves along with the cap and pulls the linkage assembly (37) with it. The first linkage (371) and the second linkage (372) of the linkage assembly (37) are gradually extended by the second mounting base (39) as the cap (200) opens. When the cap (200) reaches a certain angle, as shown in FIGS. 6 and 7, the linkage assembly (37) begins to pull the release pin (36). At this point, the push pin (35), through the locking hole (351), moves in response to the position of the release pin (36). When the cap (200) reaches the predetermined opening angle, as shown in FIGS. 8 and 9 (typically between 90 and 95 degrees), the release pin (36) is pulled out of the aligned pin holes. At this point, the spring (34), which has been in a compressed state, pushes the push pin (35) out through the through-hole (**32*a*), pressing the button (20*a*) of the signal switch (20**) to activate the switch, thereby sending the cap opening signal to the flight device control system.

In the description above, specific details have been provided for the purpose of explanation and to clarify the embodiment. However, a person with ordinary skill in this technical field will understand that one or more other embodiments may be created in practice without the specific details. Additionally, it should be understood that references throughout this description to "one embodiment," "an embodiment," or "preferred embodiment" mean that particular features, structures, or characteristics described in connection with the embodiment may be included when applying the invention in practice. Furthermore, it should be understood that in the description, various features are sometimes grouped together in one embodiment, in the drawings, or the description thereof for the purpose of simplifying the invention and assisting in understanding the different aspects of the invention, and that one or more features or details from one embodiment may be created in practice together with one or more features or details from another embodiment, where appropriate, when applying the invention in practice.

While the invention has been described in relation to certain features considered as example embodiments, it should be understood that the invention is not limited to the embodiments described, but is intended to include different structures under the broadest scope of protection to cover all modifications and equivalent structures.

The invention claimed is:

1. A mechanism for indicating the opening of a flight device guidance tube cap, comprising:

a first mounting base fixed to an inner surface of the guidance tube;

a signal switch and a switch activator configured to activate the signal switch, both mounted on the first mounting base;

the signal switch is connected and transmits a signal to a flight device control system regarding an open/closed status of the guidance tube cap;

the switch activator includes:

a device housing with a hollow cylindrical section that has a through-hole;

a push pin and a spring that apply pressure to the push pin, installed in the hollow cylindrical section through the through-hole, so that when the spring is compressed, it pushes the push pin outward through the through-hole to press the signal switch and activate the signal switch;

the device housing has a pair of aligned pin holes on both sides, extending into the hollow cylindrical section, and the push pin has a locking hole aligned with the pair of pin holes, so that when the push pin is pressed into the hollow cylindrical section through the through-hole, the locking hole aligns with the pair of pin holes to insert the release pin;

the release pin is connected at one end to a linkage assembly, and the linkage assembly is connected to a second mounting base, which is fixed to the guidance tube cap;

when the guidance tube cap is closed, a release pin is inserted through the pair of pin holes and the locking hole to hold the push pin in place, with the spring in a compressed state;

when the guidance tube cap is opened, the second mounting base moves and pulls the linkage assembly, which withdraws the release pin from the pair of pin holes and the locking hole, releasing the compressed spring and pushing the push pin to activate the signal switch.

2. The mechanism for indicating the opening of a flight device guidance tube cap according to claim 1, wherein the linkage assembly comprises multiple individual linkages in the form of bars connected sequentially by pivot joints, with a first and last linkages connected to the second mounting base and the release pin by pivot joints.

3. The mechanism for indicating the opening of a flight device guidance tube cap according to claim 2, wherein the linkage assembly comprises two individual linkages, with the first linkage being curved and a second linkage being straight.

4. The mechanism for indicating the opening of a flight device guidance tube cap according to claim 1, wherein the push pin comprises a pin head with a diameter larger than a diameter of the hollow cylindrical section, a pin body with a diameter smaller than the diameter of the hollow cylindrical section, and a pin tail with a diameter smaller than a diameter of the spring, formed by the pin body having an extended length to fit inside the spring.

5. The mechanism for indicating the opening of a flight device guidance tube cap according to claim 1, wherein the hollow cylindrical section further includes a cylindrical hole opposite and concentric with the through-hole, and the cylindrical hole is fitted with an adjustment component through a mounting component to adjust a tension of the spring.

6. The mechanism for indicating the opening of a flight device guidance tube cap according to claim 5, wherein:

the adjustment component is cylindrical with an outer thread at one end and a hexagonal shape at an other end;

the mounting includes a flange connected to the device housing by bolts at the cylindrical hole of the hollow cylindrical section, and a mounting ring with internal threads that connect with the external threads of the adjustment component.

7. The mechanism for indicating the opening of a flight device guidance tube cap according to claim 6, wherein the adjustment component has a through-hole along its axis, and a pin tail of the push pin extends through this hole.

8. The mechanism for indicating the opening of a flight device guidance tube cap according to claim 7, wherein an end of the pin tail is threaded to fit a nut, and the end of the pin tail has a hexagonal hole along its axis, allowing the user to rotate the nut while holding the hexagonal hole with a tool, a wrench or hex key, to tighten and pull the push pin backward during the installation of the release pin, after which the nut can be removed from the pin tail.

9. The mechanism for indicating the opening of a flight device guidance tube cap according to claim 1, wherein the second mounting base further includes a stopper that presses against the release pin when the guidance tube cap is in the closed position, preventing the release pin from loosening during transport.

10. The mechanism for indicating the opening of a flight device guidance tube cap according to claim 1, wherein the device housing includes a limit groove positioned on its top side, extending into the hollow cylindrical section, to receive a limit pin attached to the push pin, thereby limiting the movement of the push pin.

11. The mechanism for indicating the opening of a flight device guidance tube cap according to claim 10, wherein the limit pin is attached to the push pin via a threaded connection.

* * * * *